United States Patent [19]

Reid et al.

[11] 3,922,164

[45] Nov. 25, 1975

[54] TREATMENT OF ILMENITE

[75] Inventors: Allen Forrest Reid, Hawthorn; Hari Narayan Sinha, Surrey Hills, both of Australia

[73] Assignees: Commonwealth Scientific and Industrial Research Organization, Campbell; Murphyores Incorporated Pty., Ltd., Brisbane, both of Australia

[22] Filed: Jan. 24, 1974

[21] Appl. No.: 436,238

[30] Foreign Application Priority Data

Jan. 25, 1973 Australia............................ 2035/73
Aug. 24, 1973 Australia............................ 4627/73

[52] U.S. Cl................... 75/1; 75/101 R; 75/114; 423/86
[51] Int. Cl.².......................................... C22B 3/00
[58] Field of Search.................. 75/1 T, 101 R, 114; 423/86

[56] References Cited

UNITED STATES PATENTS

| 1,539,714 | 5/1925 | Christensen........................... 75/114 |
| 2,406,577 | 8/1946 | Alessandroni et al............. 75/114 X |
| 3,529,931 | 9/1970 | Moklebust............................. 423/86 |
| 3,649,243 | 3/1972 | Williams et al......................... 75/1 |
| 3,660,029 | 5/1972 | Naguib........................... 75/101 R X |
| 3,719,468 | 3/1973 | Lynd et al............................... 75/1 |

*Primary Examiner*—Allen B. Curtis
*Attorney, Agent, or Firm*—Sughrue, Rothwell, Mion, Zinn & Macpeak

[57] ABSTRACT

An ilmenite up-grading process characterised by the step of leaching the ilmenite with a hydrochloric acid solution containing at least 10% by weight of HCl and at least 5% by weight of one or more soluble chlorides. Particularly suitable soluble chlorides include ferrous chloride, manganese chloride, magnesium chloride, nickel chloride, calcium chloride and ammonium chloride.

4 Claims, 1 Drawing Figure

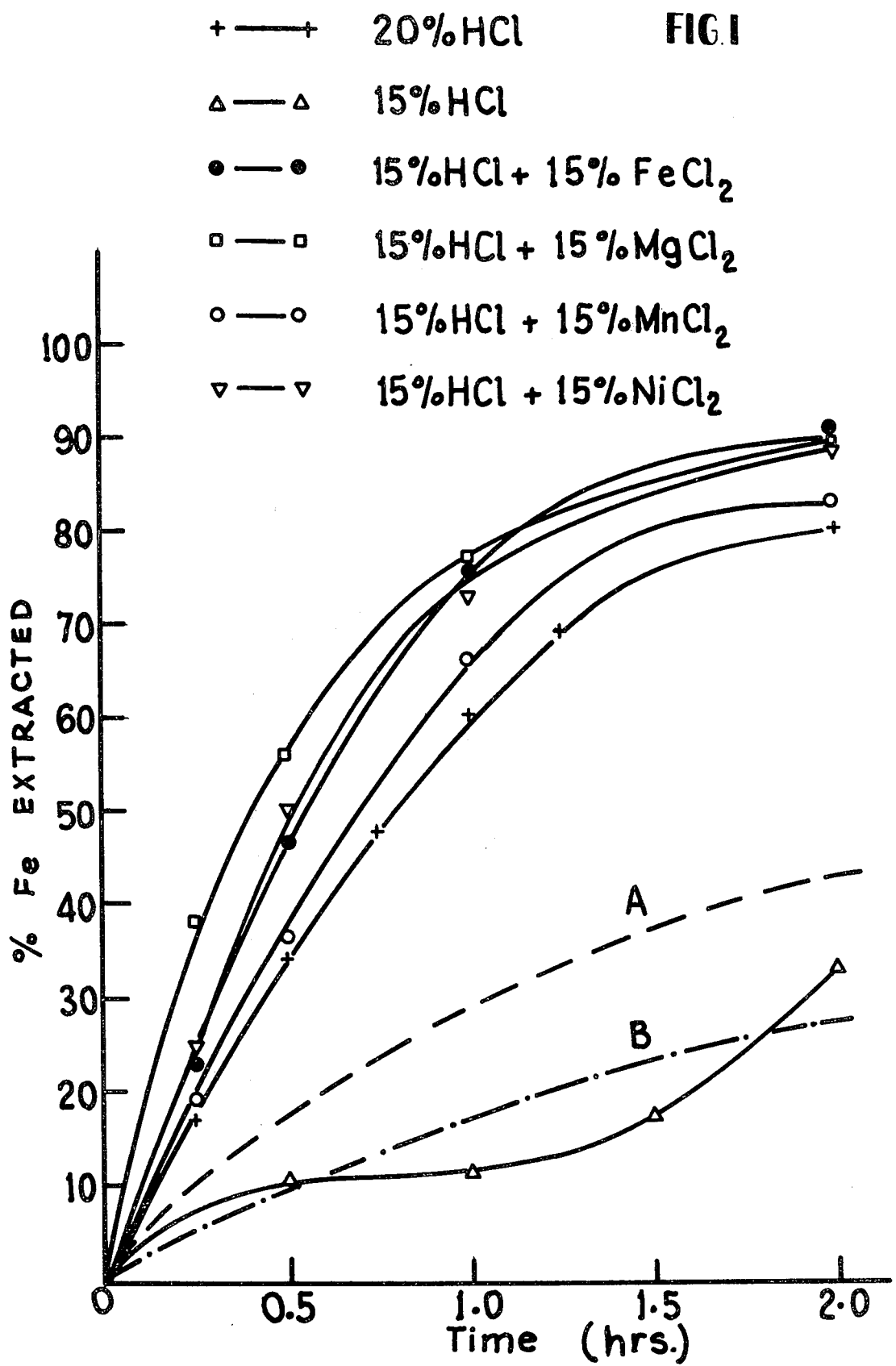

TREATMENT OF ILMENITE

This invention is concerned with the removal of iron from ilmenite to produce up-grade products of high titanium dioxide content suitable for pigment manufacture or other processing; in particular, it seeks to provide a more efficient ilmenite up-grading process enabling rapid hydrochloric acid leaching to take place.

Hydrochloric acid leaching of iron from ilmenite is well known in the art and depends upon the differential solubility of iron and titanium in this acid. It has the important advantage that the ferrous chloride leach liquor can be processed by conventional techniques to produce iron oxide as a by-product and hydrochloric acid for recycling. However, the kinetics of the leaching step are inherently poor because, at atmospheric pressure, the temperature of leaching cannot be raised above about 110°C and acid concentrations above about 20% are difficult to obtain because of the constant boiling characteristics of the hydrochloric acid - water system. High pressure leaching has been proposed to allow higher temperatures and acid concentration to be employed, but the techniques are difficult and expensive to implement in practice. On the other hand, the very extensive leaching periods needed to obtain adequate iron extraction in practice are also costly and tend to lead to the loss of titanium values in the leach liquor.

As disclosed in our British Pat. No. 1,225,826 the need for high pressure leaching can be avoided by correct pretreatment of the ilmenite. Essentially that process involves the oxidation of natural ilmenite so that substantially all the iron values associated with titanium contained therein are converted to the ferric state, followed by the reduction of the oxidized ilmenite back to the stage where the iron values are in the ferrous state. In this way, a 'synthetic ilmenite' is produced having a modified microstructure which greatly enhances the reactivity of the iron with respect to hydrochloric acid.

However, whether the pretreatment process of our prior patent is employed or not, it is still desirable, of course, to increase the efficiency of the hydrochloric acid leach from the standpoint of (a) leaching time at atmospheric pressures and (b) reduced losses of titanium values. Now, this has been made possible in accordance with the present invention by the surprising discovery that addition of one or more soluble chlorides, preferably selected from ferrous, magnesium, manganese, nickel, calcium and ammonium chlorides, will enhance the leaching rate and reduce the loss of titanium.

More particularly, according to one aspect of the present invention, there is provided an ilmenite upgrading process characterised by the step of leaching the ilmenite with a hydrochloric acid solution containing at least 10% by weight of HCl and at least 5% by weight of one or more soluble chlorides.

Preferably, the chloride ion concentration of the said solution is from 18 to 25% but the solution can contain even larger amounts of such chlorides up to the mutual solubility limit of HCl and the added chloride.

The preferred form of ilmenite for use in the process of the invention is that obtained by reduction of preoxidized ilmenite so that most of the iron values are present in the ferrous state. The ilmenite may be deliberately preoxidized in accordance with British Pat. No. 1,225,826 or may be a natural material.

The reduced ilmenite may without disadvantage contain a substantial amount of ferric or metallic iron. In addition to the desired quantities of ferrous chloride, the leach liquor may without disadvantage contain a substantial amount of ferric chloride, and when free iron metal is present such ferric chloride will have the advantage of oxidizing the metal to ferrous chloride and thereby become reduced to additional ferrous chloride.

As ferrous chloride is the reaction product of the ilmenite leaching, it would not have been expected that the addition of such high concentrations of this product to the leach liquor would increase the rate at which iron is extracted from the ilmenite, but as is shown below, the effect is substantial and valuable. By contrast, the prior art practice of using ferrous-containing wash liquors as make-up for hydrochloric acid leaching solutions, described for example in Japanese Pat. Publication 47-42219 (Application No. 47-33817) to Laporte Industries Limited (see also U.K. Provisional Pat. Application No. 6835/72) does not provide the relatively high ferrous chloride concentrations which have been found to be so beneficial in the process of this invention. Although the use of ferrous chloride is preferred because it is already present in the system and can be handled by the conventional acid regeneration processes, other soluble chlorides may be employed.

The presence of ferric chloride, as mentioned, is not harmful and can be useful in oxidizing any iron metal present, thus minimising disadvantages which might result from the presence of any metallic iron in the reduced ilmenite and providing additional ferrous chloride in situ.

The maximum concentration at which the chloride additives can be incorporated in the leach liquor depends largely upon the solubility of the chloride ion at the temperatures concerned and upon the other components of the leach liquor. In previous practice, the chloride ion concentration in the leach liquor has been limited to about 20%. For the upper limits of chloride concentrations which can be attained in practising the presently described invention, reference may be made to the literature on the solubility of chlorides in HCl solutions to determine particular operating points. In this respect the findings of F. A. Schimmel (American Chemical Society Journal Vol. 74 p. 689, 1952), will be of assistance. Compilations such as that of Seidell, "Solubilities of Inorganic Compounds" may also be used.

In applying the present invention, it has been found that solubility problems are generally avoided if the additional metal chloride is not added in amounts sufficient to raise the chloride ion concentration much above 40%. However amounts up to the solubility limit at appropriate operating temperatures and pressures may be used. Conversely, it is preferred to introduce more than 5% of the additive chloride in order to obtain a significant improvement in leaching. The addition of amounts less than 5% may produce a slight improvement but not the marked increase in leaching rates which are obtained with higher concentrations.

While significant improvements in leaching efficiency can be obtained at the operating temperatures conveniently employed in atmospheric pressure systems, the introduction of the additional chloride changes the constant boiling characteristics of the leach liquor so that somewhat higher temperatures can be employed and an additional improvement can be obtained in leaching rates. Temperatures of between about 100° and 112°C are preferred, but temperatures up to 115°C are possible with some systems and may be preferred in particular circumstances. The present invention does not exclude the use of pressure leaching as this will enable even higher temperatures to be employed, with further increases in leaching rate.

The practice of our invention also allows the initial hydrochloric acid concentration to be reduced from the 20% used in previous practice to about 15%, and at the same time markedly to increase the leaching rate obtained in previous practice.

Furthermore it has allowed the efficient upgrading of rock ilmenite pretreated according to our British Pat. No. 1,225,826.

The suprising increase in leach rate obtained by the addition of ferrous or other chlorides to the leach liquor appears to be due in part to increased complexing of the titanium values which thereby enables the acid to attack more readily the ferrous oxide component of the ilmenite structure. Increasing the chloride content of the leach liquor might therefore be expected to increase the loss of titanium values in the solution or by the precipitation of fines which cannot be readily recovered. However, in the present practice of our invention, it was found that percentages of fines produced in the presence of $FeCl_2$ at the preferred concentrations were lower than the amounts produced by conventional leaching.

The invention thus has the added and unexpected advantage of reducing titanium losses due to fines formation.

Having outlined the invention in broad terms, further details will now be provided in relation to a number of preferred situations and particular examples. The following description and the accompanying drawings are therefore provided by way of illustration and exemplification rather than by way of limitation.

Reference will be made to the accompanying drawing in which FIG. 1 is a series of leaching curves for "synthetic ilmenite" under conditions given in Example 1. Curves A and B refer to natural ilmenite with 15% HCl + 15% $FeCl_2$ and with 20% HCl, respectively, as described in Example 2.

EXAMPLE 1

In this example a beach sand ilmenite containing 23.1 w/w FeO, 18.4 w/w $Fe_2O_3$ and 54.2 w/w $TiO_2$ was oxidized in a fluid bed using air as a fluidising gas at 900°C for 2 hours, until all the iron in the ore was in the ferric state. The oxidized ore was then de-oxidised in the fluid bed by passing hydrogen at 900°C till most of the iron was present in the ferrous state. The material was cooled to room temperature in a non-oxidising atmosphere and analysed as follows:

55.5% w/w $TiO_2$, 40.7% w/w FeO.

70 gm samples of the "synthetic ilmenite" thus produced were leached with various leach solutions as described below:

i. 301 gms of 15% w/w HCl.
ii. 225 gms of 20% w/w HCl.
iii. 301 gms of 15% w/w HCl and 15% w/w $FeCl_2$.
iv. 301 gms of 15% w/w HCl and 15% w/w $MnCl_2$.
v. 301 gms of 15% w/w HCl and 15% w/w $MgCl_2$.
vi. 301 gms of 15% w/w HCl and 15% w/w $NiCl_2$.

In each case the leaching was carried out in a stirred vessel at atmospheric pressure and under reflux conditions. The percentages of iron extracted with respect to leach time in each case are plotted in FIG. 1.

It can be seen from the results in FIG. 1 that the leaching rates are considerably improved by the addition of ferrous, magnesium, manganese and nickel chlorides to hydrochloric acid solutions, with ferrous chloride giving the best extraction of iron over a 2 hour period. Indeed extraction by a 15% HCl, 15% $FeCl_2$ solution is both faster and gives higher extraction of iron than does 20% HCl, examples 1(iii) and 1(II) respectively.

Furthermore the percentage of fines produced with leach solution 1(iii) was found to be 3.5% as compared with 5.3% for the conventional leach solution 1 (ii).

It is seen from the curve for 15% HCl alone, that extraction is extremely slow and incomplete for such acid concentrations in the absence of $FeCl_2$ in comparable high concentrations.

EXAMPLE 2

In order to exemplify the increase in leaching rates produced by $FeCl_2$ addition, even in very unfavourable cases, natural beach sand ilmenite with analysis as in example 1 was leached without any pretreatment.

Reaction was performed at atmospheric pressure and under reflux conditions, and amounts and concentrations were as for leach solution 1(ii) and 1(iii).

Curve B, FIG. 1, shows the progress of iron extraction with time using 20% HCl, while curve A shows the extraction behaviour with 15% $FeCl_2$. Although both extraction rates are low, that for the solution containing 15% HCl, 15% $FeCl_2$ is clearly superior.

EXAMPLE 3

Canadian rock ilmenite was ground to −50, +200 mesh, screened and electrostatically and magnetically separated from quartz and other gangue. It was then oxidized and reduced as in example 1, and two portions were leached as follows:

i. 65 gms of sample with 264 gms of 20 w/w HCl at a reflux temperature of 109°C.
ii. 58 gms of sample with 276 gms of 15 w/w HCl and 15 w/w $FeCl_2$ at a reflux temperature of 111°C.

The degree of leaching versus time for these two cases is given in Table 1.

TABLE 1

| | Leaching of Rock Ilmenite | | | | | |
|---|---|---|---|---|---|---|
| Time,hours | 0.5 | 1 | 1.5 | 2 | 2.5 | 3 |
| | | | % iron leached | | | |
| 20% HCl | 77.4 | | 95.5 | | 96.9 | 96.5 |
| 15% HCl, 15% $FeCl_2$ | 83 | 95.4 | | 96.7 | | 99.0 |

The solution containing ferrous chloride has the additional advantage of allowing a lower initial acid concentration, and it produced somewhat lower fines, 2,2%, that the conventional 20% HCl leach solution, which gave 2.5% of fines.

EXAMPLE 4

To determine a lower limit at which ferrous chloride addition was significantly effective, 1 70 gm sample of "synthetic ilmenite" prepared as in example 1 was leached with a solution of 301 gms of 15% w/w HCl and 5% w/w FeCl$_2$, under reflux conditions. Iron extraction at 1.0 and 2.0 hours was 47% and 71% respectively.

In a further experiment in which the FeCl$_2$ concentration was dropped to just below 5%, but other conditions were the same, the leaching rate was only slightly better than for 15% HCl alone, FIG. 1.

Thus, 5% of FeCl$_2$ represents the lower limit at which a useful effect is obtained, and higher concentrations of FeCl$_2$ are to be preferred.

EXAMPLE 5

To determine the effect of initial acid:ilmenite stoichiometric ratio a 70 gm sample of synthetic ilmenite prepared as in Example 1 was leached under reflux conditions with 241 gms of 15% w/w HCl and 15% w/w FeCl$_2$, an acid: ilmenite ratio of 1.2 : 1 as compared with 1.5 : 1 in example 1(iii). Extraction rates and extent of extraction were within 2% of those obtained for example 1(iii), shown in FIG. 1.

EXAMPLE 6

To isolate the chemical effect of added chloride from the effect of increased temperature, 70 gm samples of synthetic ilmenite prepared as in Example 1 were reacted with leach solutions as specified below.

i. 225 gms of 20% w/w HCl
ii. 301 gms of 15% w/w HCl and 15% w/w FeCl$_2$.

In both cases leaching was carried out in a stirred vessel maintained at 103°C. The results are shown in Table 2.

TABLE 2

Chloride leaching of ilmenite at 103°C.

| Time, hours Leach solution | 0.5 | 1.0 % iron leached | 2.0 |
| --- | --- | --- | --- |
| 20% HCl | 35 | 61 | 82.5 |
| 15% HCl 15% FeCl$_2$ | 37 | 63 | 84 |

Under these fixed temperatures conditions the leaching rate with 15% HCl, 15% FeCl$_2$ was slightly greater than that for 20% HCl, despite the lower acid concentration.

EXAMPLE 7

70 gms of synthetic ilmenite prepared as in Example 1 were leached at reflux temperature with 301 gms of a solution containing 15 w/w % HCl and 15 w/w % of CaCl$_2$. At reaction times of 0.5, 1.0 and 2.0 hours, iron extraction from the ilmenite was 45.0, 66.0 and 85.0% respectively.

EXAMPLE 8

70 gms of synthetic ilmenite prepared as in Example 1 were leached at reflux temperature with 301 gms of a solution containing 15 w/w % HCl and 15 w/w % of NH$_4$Cl. At reaction times of 0.5, 1.0 and 2.0 hours, iron extraction from the ilmenite was 28.0, 54.7 and 77.2% respectively.

The claims defining the invention are as follows:

1. In an ilmenite upgrading process comprising the steps of:
   a. oxidizing the ilmenite to convert substantially all of the iron values associated with titanium therein to the ferric state;
   b. reducing the oxidized ilmenite to convert the said iron values substantially to the ferrous state;
   c. leaching the reduced material with a hydrochloric acid solution;
   the improvement which comprises carrying out the leaching step with a solution containing at least 15% by weight of HCl and ferrous chloride in an amount sufficient to increase the leaching rate of said solution to a rate in excess of that of 20% HCl under comparable reaction conditions.

2. A process as claimed in claim 1, wherein the total concentration of chloride ion in the solution is from about 18 to about 25% by weight.

3. The process of claim 1, wherein the leaching step is performed at a temperature between 100° and 112°C.

4. The process of claim 1, wherein the hydrochloric acid solution contains about 15% hydrochloric acid and about 15% ferrous chloride.

* * * * *